(12) United States Patent
Windridge et al.

(10) Patent No.: US 11,760,553 B2
(45) Date of Patent: Sep. 19, 2023

(54) CONTAINER

(71) Applicant: MILK & WATER LIMITED, London (GB)

(72) Inventors: Katherine Windridge, Braunton (GB); Samuel Windridge, Braunton (GB)

(73) Assignee: MILK & WATER LIMITED, London (GB)

(*) Notice: Subject to any disclaimer, the term of this patent is extended or adjusted under 35 U.S.C. 154(b) by 0 days.

(21) Appl. No.: 17/297,867

(22) PCT Filed: Oct. 25, 2019

(86) PCT No.: PCT/GB2019/053038
§ 371 (c)(1),
(2) Date: May 27, 2021

(87) PCT Pub. No.: WO2020/115457
PCT Pub. Date: Jun. 11, 2020

(65) Prior Publication Data
US 2022/0033165 A1 Feb. 3, 2022

(30) Foreign Application Priority Data
Dec. 7, 2018 (GB) ...................................... 1819975

(51) Int. Cl.
*B65D 81/32* (2006.01)
*A61J 11/00* (2006.01)
(Continued)

(52) U.S. Cl.
CPC ............ *B65D 81/3205* (2013.01); *A61J 11/00* (2013.01); *B65D 43/0231* (2013.01); *B65D 81/3841* (2013.01)

(58) Field of Classification Search
CPC ............ B65D 81/3205; B65D 81/3841; B65D 43/0231; A61J 11/00; A47J 41/0055; A47J 31/41; A47J 31/40; A47J 43/27
(Continued)

(56) References Cited

U.S. PATENT DOCUMENTS 1,199,772 A * 10/1916 Engel ...................... A47J 41/02
215/12.1
2,836,323 A * 5/1958 Robinson ............... B65D 71/00
220/4.27
(Continued)

FOREIGN PATENT DOCUMENTS

CN 104302551 A 1/2015
JP S5126075 U 2/1976
(Continued)

OTHER PUBLICATIONS

GB Search Report on GB Appln. 1720432.2 dated May 10, 2018 4pgs.
(Continued)

*Primary Examiner* — Luan K Bui
*Assistant Examiner* — Brijesh V. Patel
(74) *Attorney, Agent, or Firm* — Foley & Lardner LLP

(57) ABSTRACT

A container (10) is described. The container (10) comprises: a first receptacle (12) defining a first chamber (16) and having a first aperture (32); and a second receptacle (14) defining a second chamber (18) and having a second aperture (42). The container (10) also includes a reclosable opening which allows access to the first and second receptacles (12, 14). The second receptacle (14) is movably mounted upon the first receptacle (12) such that the first and second apertures (32, 42) may be aligned to allow the contents of the second chamber (18) to be introduced into the first chamber (16).

4 Claims, 7 Drawing Sheets

(51) Int. Cl.
B65D 43/02 (2006.01)
B65D 81/38 (2006.01)

(58) Field of Classification Search
USPC .......... 206/219, 22, 459.5, 509; 220/23.86, 220/4.27, 501–502, 521, 713, 903; 215/6, 215/387, 902, DIG. 8; 222/129; 426/120, 115
See application file for complete search history.

(56) References Cited

U.S. PATENT DOCUMENTS

| | | | | |
|---|---|---|---|---|
| 2,975,925 A * | 3/1961 | Chambers | | B65D 25/48 206/0.5 |
| 3,443,726 A * | 5/1969 | Godsted | | B65D 81/3211 222/541.6 |
| 3,705,661 A * | 12/1972 | Davis | | A47J 41/02 220/592.16 |
| 3,768,697 A * | 10/1973 | Lerner | | B67B 7/26 222/80 |
| 3,802,604 A * | 4/1974 | Morane | | B65D 51/28 222/85 |
| 3,825,410 A | 7/1974 | Bagshawe | | |
| 3,856,138 A * | 12/1974 | Maekawa | | B65D 81/3222 604/416 |
| 4,444,324 A * | 4/1984 | Grenell | | B65D 25/04 426/115 |
| 4,778,068 A * | 10/1988 | Kohus | | A61J 9/00 215/11.1 |
| 4,823,946 A * | 4/1989 | Stoeffler | | B65D 81/3211 215/DIG. 8 |
| 5,085,330 A | 2/1992 | Paulin | | |
| 5,088,627 A * | 2/1992 | Musel | | B65D 51/32 222/145.5 |
| 5,090,213 A * | 2/1992 | Glassman | | A47G 19/2288 62/457.2 |
| 5,152,965 A * | 10/1992 | Fisk | | B01L 3/502 604/82 |
| 5,275,298 A * | 1/1994 | Holley, Jr. | | A61J 1/2093 215/11.4 |
| 5,312,014 A * | 5/1994 | Hamlin | | A47G 19/2272 220/717 |
| 5,433,328 A * | 7/1995 | Baron | | A61J 9/00 215/11.4 |
| 5,553,735 A * | 9/1996 | Kimura | | A47G 19/2227 362/101 |
| 5,564,600 A * | 10/1996 | Renault | | B65D 81/3211 222/129 |
| 5,613,623 A * | 3/1997 | Hildebrandt | | B65D 81/3211 222/129 |
| 5,673,789 A * | 10/1997 | Degraff-Eugene | | A47G 19/2288 206/217 |
| 5,823,380 A * | 10/1998 | Cox | | A47J 36/2461 222/456 |
| 5,992,693 A * | 11/1999 | Albisetti | | B65D 81/3211 222/129 |
| 6,045,254 A * | 4/2000 | Inbar | | B65D 51/2864 215/DIG. 8 |
| 6,050,443 A * | 4/2000 | Tung | | A47G 19/2227 220/62.12 |
| 6,135,275 A * | 10/2000 | Kelders | | B65D 81/3211 215/DIG. 8 |
| 6,269,979 B1 * | 8/2001 | Dumont | | B65D 81/3222 222/129 |
| 7,210,596 B1 * | 5/2007 | Ruccolo | | A47G 19/2272 220/717 |
| 7,331,478 B2 * | 2/2008 | Aljadi | | A61J 9/00 215/11.4 |
| 7,770,410 B2 * | 8/2010 | Cote | | F25D 3/08 62/530 |
| 7,798,346 B2 * | 9/2010 | Nelson | | B65D 81/3205 220/23.6 |
| 7,850,027 B2 * | 12/2010 | Hayes | | A61J 11/002 215/11.4 |
| 7,866,183 B2 * | 1/2011 | Roth | | A47J 36/28 62/457.3 |
| 8,136,660 B2 * | 3/2012 | Sharon | | B65D 11/04 206/221 |
| 8,146,758 B1 * | 4/2012 | Peres | | A61J 9/008 215/11.1 |
| 8,439,221 B2 * | 5/2013 | Davis | | A45F 3/18 220/592.01 |
| 8,459,450 B1 * | 6/2013 | Whitaker | | A61J 9/00 215/11.4 |
| 8,528,764 B2 * | 9/2013 | Chapple | | B65D 11/04 215/388 |
| 8,672,123 B1 * | 3/2014 | Vallejo | | A61J 9/00 222/153.04 |
| 8,770,434 B2 * | 7/2014 | Shearer | | A47G 19/2288 220/603 |
| 9,004,301 B2 * | 4/2015 | Wahlstrom | | A61J 1/2093 215/11.4 |
| 9,016,488 B1 * | 4/2015 | Peres | | A61J 9/008 215/11.1 |
| 9,215,954 B2 * | 12/2015 | Bennett | | A47J 43/27 |
| 9,414,700 B2 * | 8/2016 | Melton | | A47G 19/2227 |
| 9,549,633 B2 * | 1/2017 | Ng | | A47J 43/27 |
| 9,930,982 B2 * | 4/2018 | Matsui | | A47G 23/0233 |
| 2004/0118709 A1 | 6/2004 | Cho | | |
| 2006/0131309 A1 * | 6/2006 | Listenberger | | A47G 19/2272 220/500 |
| 2007/0221513 A1 | 9/2007 | Taylor-Sharp et al. | | |
| 2008/0272118 A1 * | 11/2008 | Wang Wu | | G02B 27/08 220/62.12 |
| 2010/0213156 A1 * | 8/2010 | Belnap | | A61J 1/2093 215/11.1 |
| 2012/0024862 A1 * | 2/2012 | Otsuka | | B65D 81/3211 220/502 |
| 2012/0193317 A1 | 8/2012 | Brown et al. | | |
| 2013/0037506 A1 | 2/2013 | Wahlstrom | | |
| 2014/0131229 A1 * | 5/2014 | Tippit | | B65D 81/3211 206/219 |
| 2015/0360804 A1 * | 12/2015 | Ayeni | | B65D 11/04 215/6 |
| 2016/0038378 A1 | 2/2016 | Al-Hakim | | |
| 2016/0192797 A1 * | 7/2016 | Yang | | B65D 53/02 220/592.17 |
| 2016/0311601 A1 * | 10/2016 | Genchev | | B65D 81/3211 |
| 2017/0305640 A1 * | 10/2017 | Thompson | | B65D 77/0493 |

FOREIGN PATENT DOCUMENTS

| | | |
|---|---|---|
| JP | H710172 A | 1/1995 |
| WO | WO-93/11049 A1 | 6/1993 |

OTHER PUBLICATIONS

International Search Report and Written Opinion on PCT/GB2019/053038 dated Dec. 18, 2019 (8 pages).

Chinese Office Action for CN Appln. No. 201980080950.0 dated Nov. 10, 2022.

\* cited by examiner

CONTAINER

CROSS-REFERENCE TO RELATED APPLICATIONS

This application is a U.S. National Stage Application under 35 U.S.C. 371 of International Patent Application No. PCT/GB2019/053038, filed on Oct. 25, 2019, which claims priority to Great Britain Patent Application No. 1819975.2, filed on Dec. 7, 2018, the content of each of which is incorporated herein by reference in their entireties.

FIELD OF INVENTION

The present invention relates to containers having chambers for both a liquid and an additive which may be added to the liquid.

BACKGROUND OF INVENTION

It is often desired for a person to combine an additive substance with a liquid such that the additive substance is mixed with or dissolved in the liquid. For example, the person may be training and wishes to prepare a protein shake, where the additive substance may be a protein powder and the liquid may be milk or water. Alternatively, the person may have a baby and may wish to prepare formula milk for the baby by mixing formula milk powder with water.

If the person is not close to a supply of suitable liquid, the person requires two separate containers. One of the containers is for the additive substance and the other container is for the liquid. When the person wishes to combine the additive substance with the liquid, the person adds the additive to the container containing the liquid and mixes the liquid and the additive. Alternatively, the user could mix the additive and the liquid in advance. However, if the additive is formula milk powder and the liquid is water, the mix of formula milk and water must be consumed within less than two hours of its preparation. This is impractical for certain situations.

It is an object of the present invention to mitigate or obviate at least one problem with prior drinking containers.

SUMMARY OF INVENTION

According to a first aspect of the present invention, there is provided a container comprising:
  a first receptacle defining a first chamber, the first receptacle having a first aperture;
  a second receptacle defining a second chamber, the second receptacle having a second aperture; and
  a reclosable opening allowing access to the first and second receptacles,
  wherein the second receptacle is movably mounted upon the first receptacle such that the first and second apertures may be aligned to allow the contents of the second chamber to be introduced into the first chamber, wherein the first receptacle is insulated.

For the avoidance of any doubt, the first and second apertures may be partially aligned but still allow the contents of the first receptacle to be introduced into the second receptacle. Such partial alignment is considered alignment within the context of this invention.

The first receptacle may comprise inner and outer sleeves which define an insulating chamber provided between the inner and outer sleeves.

The second receptacle may comprise a hopper portion having an inwardly tapered surface which tapers inwardly towards the second aperture.

The second receptacle may be rotatably mounted upon the first receptacle such that the first and second apertures may be aligned.

The second receptacle may be rotatably mounted upon the first receptacle by way of a snap-fit connection that is configured to prevent axial movement of the second receptacle with respect to the first receptacle but allow rotational movement of the second receptacle with respect to the first receptacle.

The second receptacle component may comprise the reclosable opening, and the first receptacle comprises a base of the container and the base is provided with a threaded portion for connecting the base to another container having a cooperating threaded portion.

The reclosable opening may comprise a lid threadably connected to the second receptacle by a second threaded portion provided on an outer surface of the second receptacle, wherein the second threaded portion is configured to cooperate with the first threaded portion of another container of the same construction as the container such that the two containers may be connected.

The inner and outer sleeves may be threadably connected.

According to a second aspect of the present invention, there is provided a kit comprising:
  the container of the first aspect, wherein the second receptacle is removably mounted upon the first receptacle, wherein the first receptacle is arranged such that when the second receptacle is removed from the first receptacle the first receptacle is open such that access to the first chamber is permitted; and
  a closure for closing the first receptacle when the second receptacle is removed from the first receptacle, the closure comprising a teat arranged to selectively allow fluid inside the first receptacle to pass through the closure when the closure closes the first receptacle.

The closure may comprise a body. The teat may be a first teat and may be removably mounted upon the body. The kit may comprise at least a second teat which is mountable upon the body when the first teat is removed from the body. The second teat may have a different shape with respect to the first teat.

BRIEF DESCRIPTION OF THE DRAWINGS

Preferred embodiments of the present invention will now be described, by way of example only, with reference to the accompanying drawings, in which.

DETAILED DESCRIPTION OF THE DRAWINGS

Figure 1A:
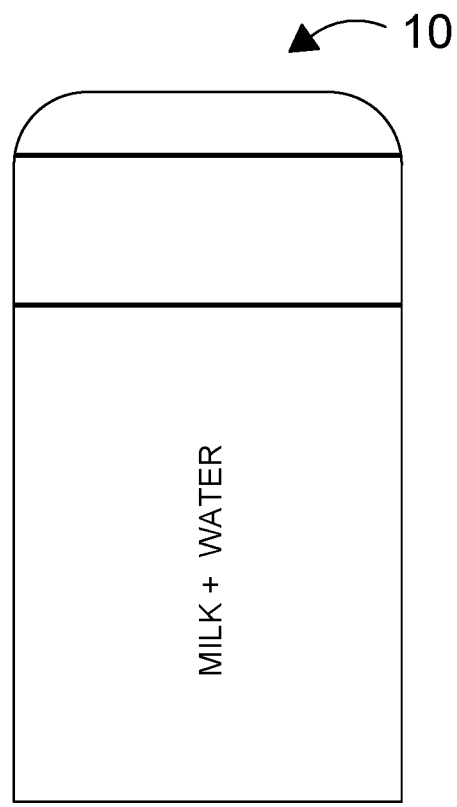
FIGS. 1A and 1B show side views of a container in accordance with the invention.
Figure 1B:
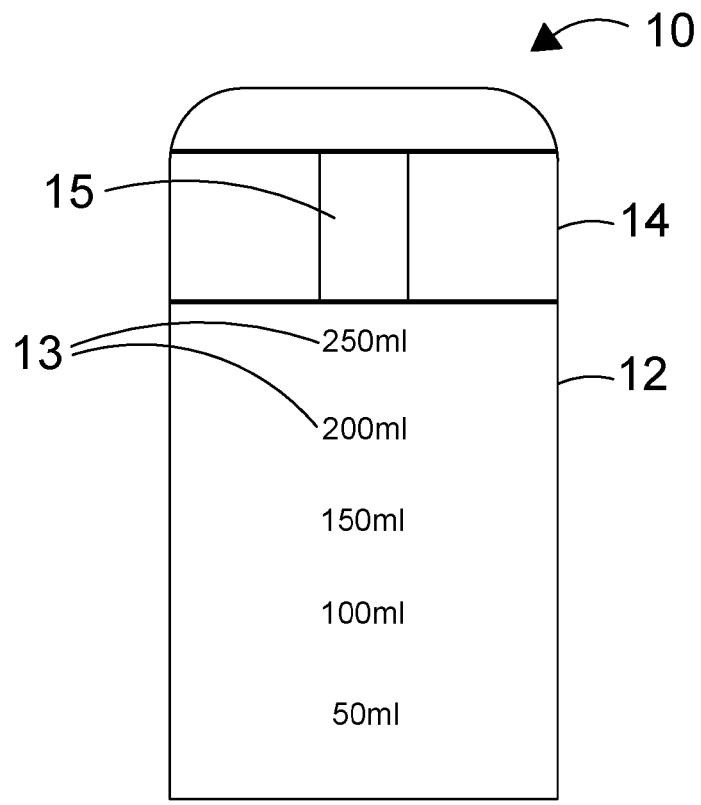
Figure 2:
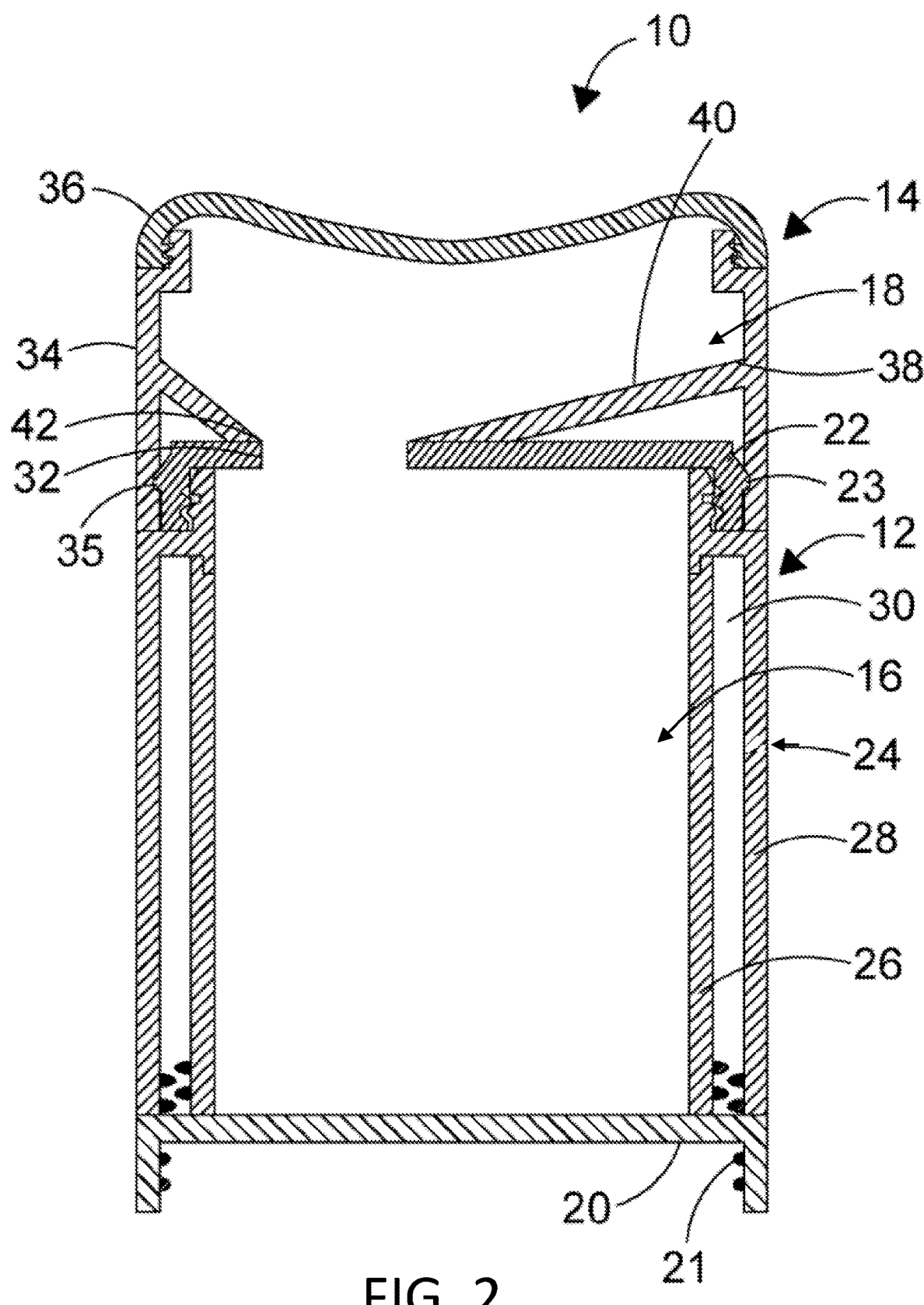
FIG. 2 shows a sectional view of the container of FIGS. 1A and 1B.

With reference to FIGS. 1 and 2, there is shown a container 10. In the depicted example, the container 10 is a beaker. However, the container 10 may be a different drinking container such as a bottle or a canteen, or a food container. The container 10 comprises first and second receptacles 12, 14. The first receptacle 12 defines a first chamber 16 and the second receptacle 14 defines a second chamber 18. The first and second receptacles 12, 14 may be transparent to a certain degree, and may be provided with markings 13 which indicate the amount of substance contained within each receptacle 12, 14. As shown in FIG. 1B, the second receptacle 14 may be provided with a grip portion 15 for the user to grip when twisting the second receptacle 14 relative to the first receptacle 12.

In the depicted example, the first receptacle 12 comprises a base 20 of the container 10. A first cylindrical sidewall 24 extends upwardly from the base 20. The first cylindrical sidewall 24 comprises inner and outer sleeves 26, 28. The inner and outer sleeves 26, 28 define an internal cavity 30 which is located between the inner and outer sleeves. The internal cavity 30 provides insulation for a substance located inside the first receptacle 12. The inner sleeve 26 comprises an external surface which is threadably connected to an internal surface of the outer sleeve 28. The inner sleeve 26 is fixed to the base 20, whereas the outer sleeve 28 is not fixed to the base 20. This means that the base 20 and the inner sleeve 26 can be detached from the outer sleeve 28. A first cap member 22 is fitted over the end of the first cylindrical sidewall 24 remote from the base 20. The first cap member 22 is threadably connected to an outer surface of the end of the first cylindrical sidewall 24 remote from the base 20 such that the first cap member 22 may be detached from the first cylindrical sidewall 24. The first cap member 22 is provided with a first aperture 32, which allows communication with the first chamber 16. The first aperture 32 is radially offset from a central axis of the container 10. An outer surface of the first cap member 22 is provided with an annular protrusion 23. The base 20 is provided with an annular flange, which has a first threaded internal surface 21. This is for attaching the base to another container 10 having a cooperating threaded portion.

In the depicted example, the second receptacle 14 comprises a second cylindrical sidewall 34. An internal surface of the second cylindrical sidewall 34 is provided with an annular groove 35. The second cylindrical sidewall 34 extends upwardly from the annular groove 35. A second cap member 36 is fitted over the second cylindrical sidewall 34. The second cap member 36 is threadably connected to the second cylindrical sidewall 34 by way of a threaded external surface provided on an outer surface of the second cylindrical side wall 34 and a second threaded internal surface provided on an internal surface of the second cap member 36. The second receptacle 14 also comprises a hopper portion 38 which has an inwardly tapering surface 40 which tapers inwardly from a portion of the internal surface of the second cylindrical sidewall 34 located above the annular groove 35 to a second aperture 42 of the second receptacle. The second aperture 42 allows communication with the second chamber 18 defined by the second receptacle 14. The second aperture 42 is radially offset from the central axis of the container 10.

The annular protrusion 23 of the first receptacle 12 is receivable in the annular groove 35 of the second receptacle 14. The protrusion 23 and groove 35 form a snap-fit connection that connects the first receptacle 12 to the second receptacle 14. The snap-fit connection prevents axial movement of the first receptacle 12 with respect to the second receptacle 14, but allows rotational movement of the first receptacle 12 with respect to the second receptacle 14. The first and second apertures 32, 42 are positioned such that they may be selectively unaligned and aligned as a result of the rotational movement of the first receptacle 12 with respect to the second receptacle 14. In FIG. 2, the container 10 is depicted in a position where the first and second apertures 32, 42 are aligned.

Figure 3A:
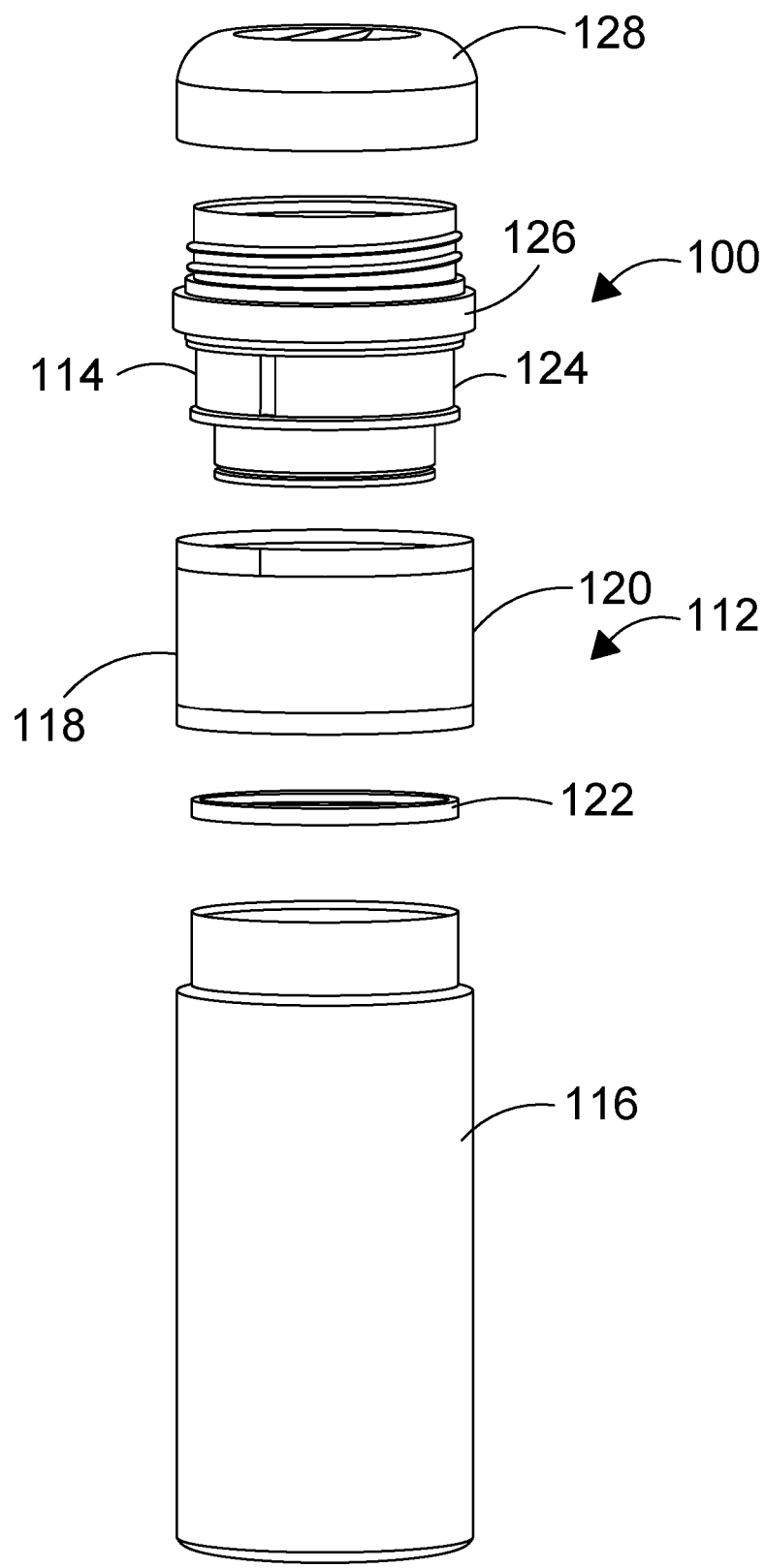
FIGS. 3A to 3D show a further container in accordance with the invention.
Figure 3D:
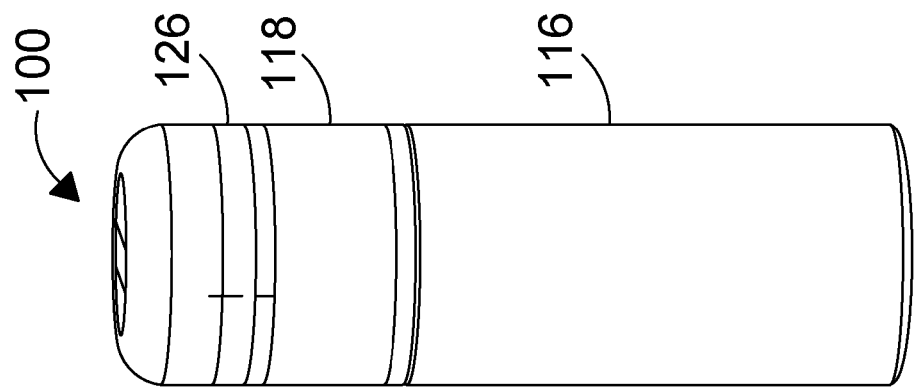
Figure 3C:
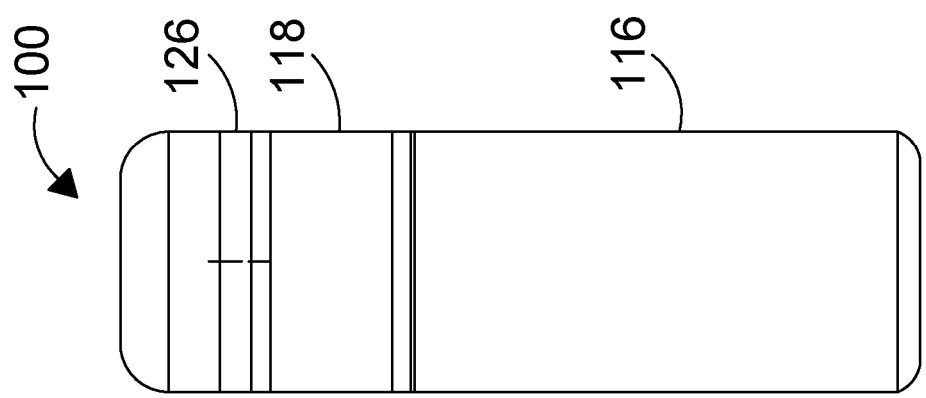
Figure 3B:
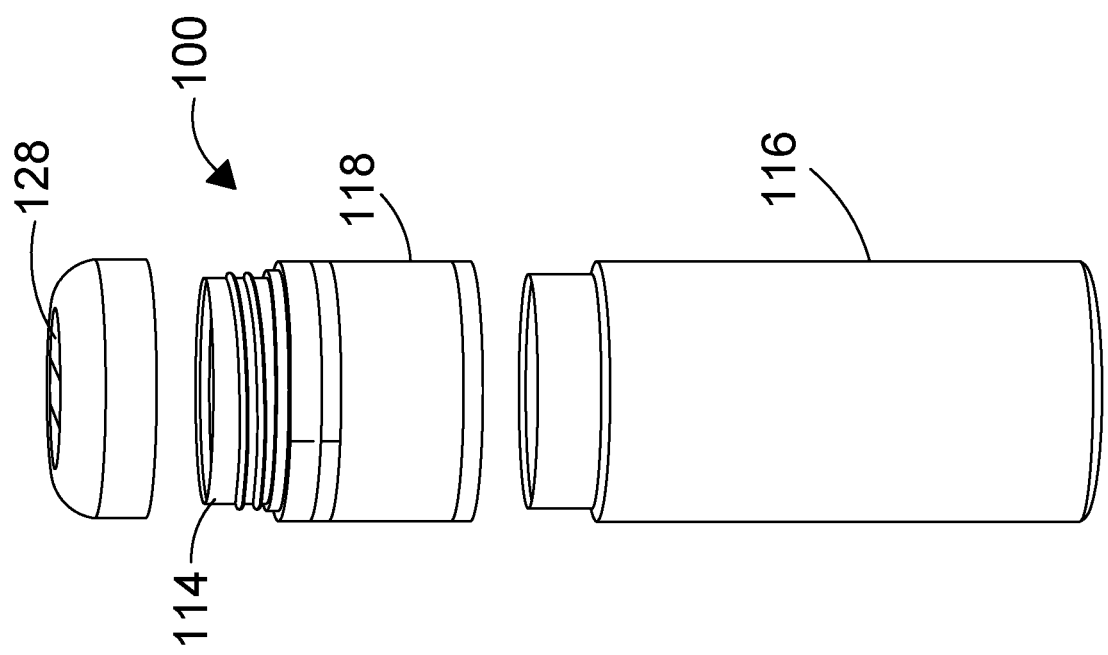

With reference to FIGS. 3A to 3D, there is shown a further container 100 in accordance with the present invention. This container 100 includes first and second receptacles 112, 114. The first receptacle 112 defines a first chamber therein and the second receptacle 114 defines a second chamber therein. The first receptacle 112 has a first aperture (not shown) that is alignable with a second aperture of the second receptacle 114. In the depicted example, the first receptacle 112 comprises an insulated section 116, and a top section 118, which is threadably attached to the insulated section (no threads are shown in FIG. 3A). The insulated section 116 may comprise inner and outer sleeves which define an insulating chamber therebetween. The insulating section 116 may be formed from stainless steel.

The top section 118 includes a cylindrical sidewall 120 and a transverse wall (not shown) located within the sidewall. The transverse wall of the top section defines the roof of the first chamber when the top section 118 is attached to the insulated section 116. The transverse wall includes the first aperture of the first receptacle 112. Optionally an O-ring 122 may be provided around the outer circumference of the transverse wall. An inner surface of the cylindrical side wall 120 comprises an annular groove (not shown).

The second receptacle 114 comprises an annular protrusion which is receivable in the annular groove. The protrusion and annular groove form a snap-fit connection that connects the first receptacle 112 to the second receptacle 114. The snap-fit connection prevents axial movement of the first receptacle 112 with respect to the second receptacle 114, but allows rotational movement of the first receptacle 112 with respect to the second receptacle 114. A base of the second receptacle 114 comprises the second aperture, which is alignable with the first aperture of the first receptacle 112. The second receptacle 114 comprises a second cylindrical sidewall 124. Provided on the outer surface of the second cylindrical sidewall 124 is an annular ring 126, which projects outwardly from the second cylindrical sidewall. A cap 128, which allows access to the second chamber when removed, is threadably connected to the top of the second cylindrical sidewall 124. Alternatively, the cap 128 may be connected to the top of the second cylindrical sidewall 124 by way of a snap-fit connection.

Figure 4:
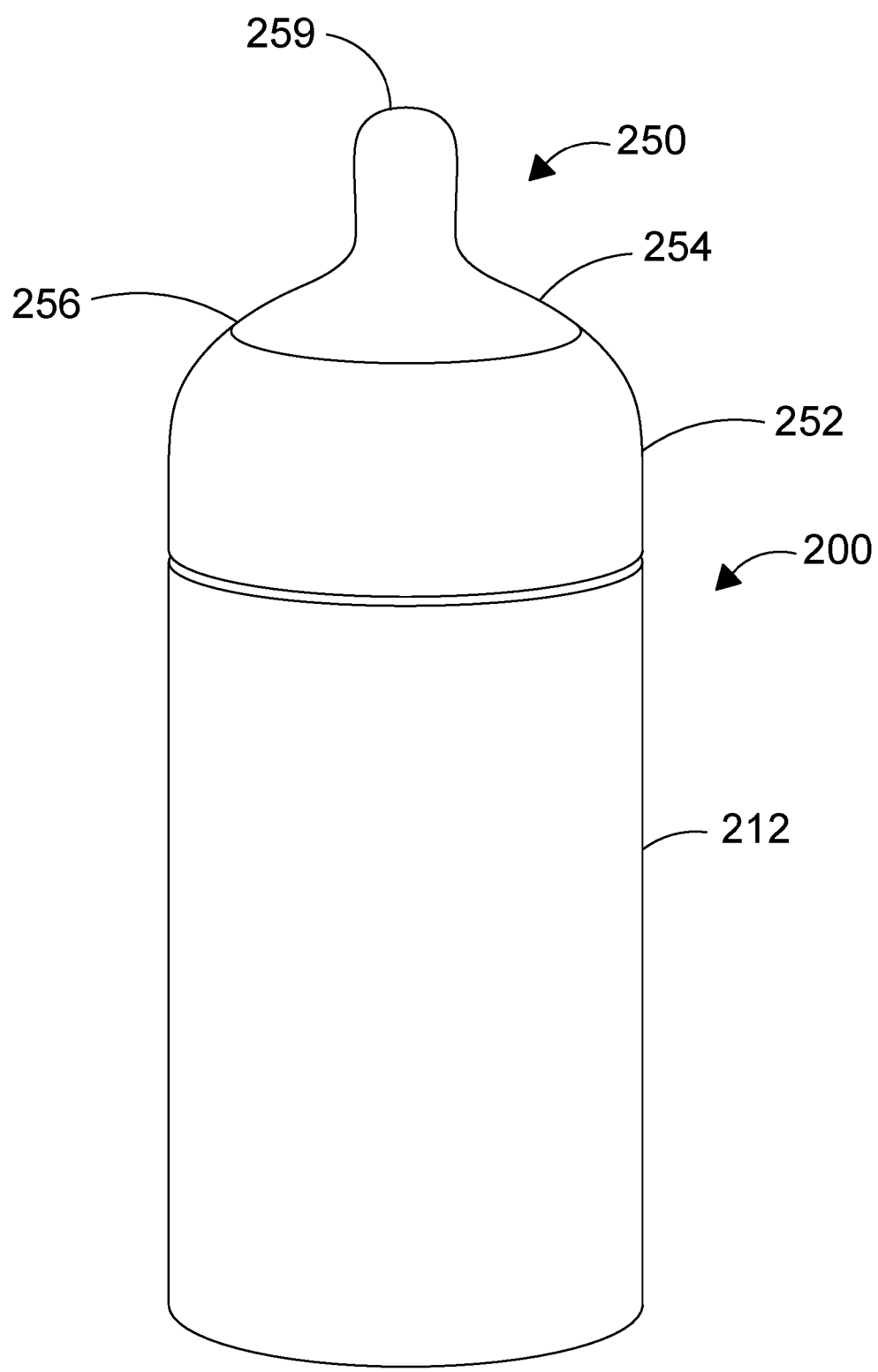
FIG. 4 shows a first receptacle of yet a further container in accordance with the invention with a closure attached thereto.

With reference to FIGS. 4 to 8, there is shown the first receptacle of yet another container 200 in accordance with the present invention. Like the containers 10, 100 described above the container 200 includes first 212 and second receptacles with first and second apertures, where the second receptacle is movably mounted upon the second receptacle such that the first and second apertures may be aligned. The second receptacle of the container 200 of FIG. 4 may be removably mounted upon the first receptacle 212, and in FIG. 4 the second receptacle has been removed from the first receptacle. The second receptacle of the container of FIG. 4 is therefore not shown.

The first receptacle 212 may be arranged such that when the second receptacle is removed from the first receptacle, the first receptacle is open and access to the first chamber is permitted. In the depicted example, the first receptacle 212 is generally cylindrical. The first receptacle may be insulated and comprise the arrangement of inner and outer sleeves with an insulating chamber therebetween described above. As shown in FIG. 4 a closure 250 may be attached to the first receptacle 212 when the second receptacle has been removed from the first receptacle. The closure 250 is for closing the first receptacle 212, and comprises a body portion 252 and a teat 254 mounted upon the body portion. Preferably, the teat 254 is removably mounted upon the body portion 252. The teat 254 comprises a main teat portion 256 and a nipple portion 259 which is arranged to selectively allow fluid located in the first receptacle 212 to pass through the closure 250 when the nipple portion is sucked by an infant.

Figure 6:
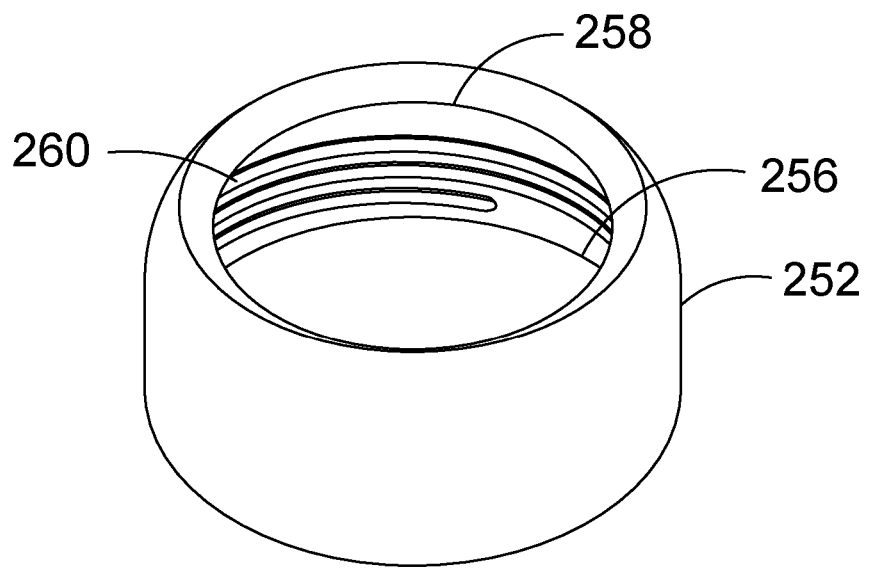
FIG. 6 shows an external view of a body portion of the closure of FIG. 4
Figure 7:
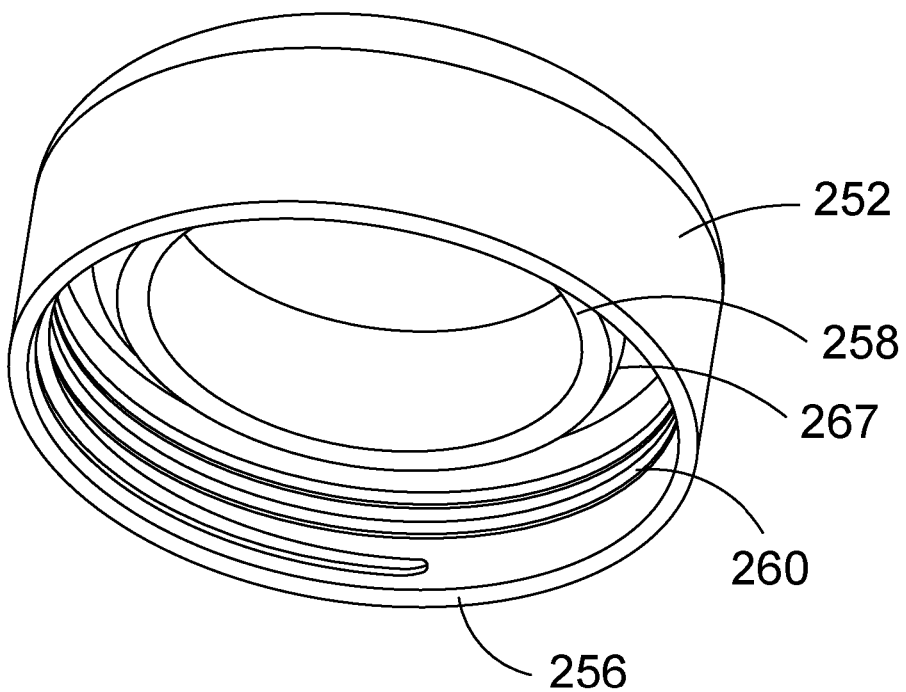
FIG. 7 shows an internal view of the body portion of FIG. 6.

The body portion 252, which is shown in greater detail in FIGS. 6 and 7, is mountable upon the first receptacle 212. As shown, the body portion 252 comprises an inlet 256 and an outlet 258. Further the body portion 252 is a generally cylindrical member which is arranged to be placed over an end of the first receptacle 212. In the depicted example, the body portion 252 is mountable upon the first receptacle 212 by way of a first threaded arrangement 260 which is arranged to engage with a corresponding threaded arrangement provided on the first receptacle 212.

Figure 8:
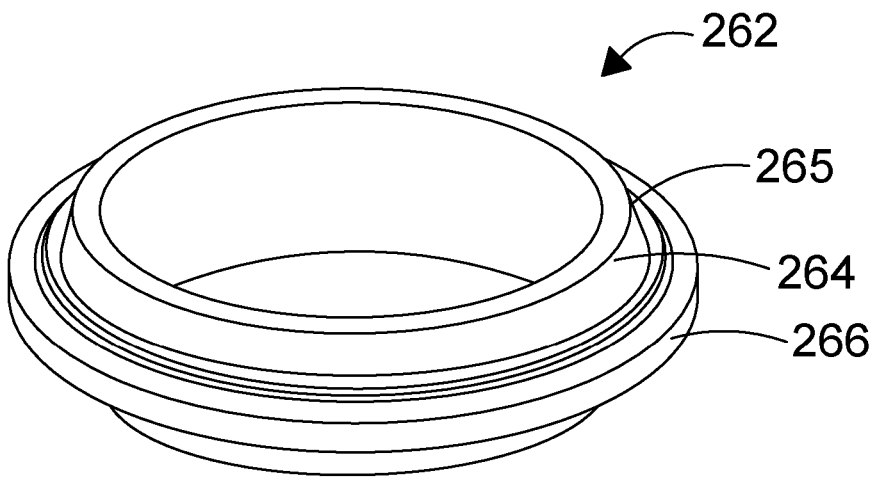
FIG. 8 shows a mounting component of the closure of FIG. 4.

FIG. 8 shows an annular mounting component 262. The annular mounting component 262 is arranged to mount the teat 254 upon the body portion 252. In the depicted example, the annular mounting component 262 comprises an annular body 264 and an annular flange 266 which projects radially from the annular body 264. As depicted, the annular body 264 and flange 266 are formed as one piece. An upper portion 265 of the annular body 266 is arranged to be press fitted inside the body portion 252. Specifically, an upper part 267 of the internal surface of the body portion 252 is arranged to receive the upper portion 265 of the annular body such that the upper portion of the annular body 266 may be press fitted inside the body portion 252.

Figure 5:
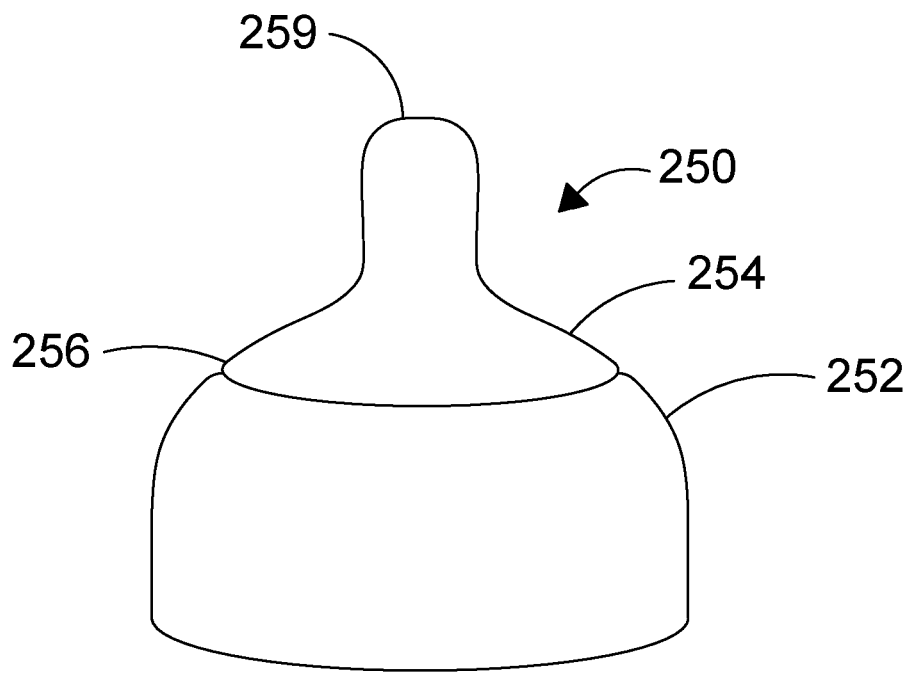
FIG. 5 shows the closure of FIG. 4.

With reference to FIG. 5, the teat 254 is mounted upon the body portion 252 by placing the body portion over the teat such that the nipple portion 259 controls the flow of fluid through the outlet 258 of the body portion. This involves the nipple portion 259 of the teat being drawn up through the outlet 258 by the user. The user then press fits the upper portion of the annular body 264 inside the upper part 267 of the internal surface of the body portion 252 such that a portion of the main teat portion 256 is located between the upper portion of the annular body and the upper part of the internal surface of the body portion 252. A plurality of teats 254 may be provided with the container 200. Each of these teats 254 may have a different shape and may be mountable upon the body portion 252. For example, one of the teats 254 may have the shape of a "New-Age" teat and another of the teats may have the shape of a "Traditional Rubber" teat.

INDUSTRIAL APPLICABILITY

In use, when using the container 10, the user detaches the second receptacle 14 from the first receptacle 12 by unsnapping the annular protrusion 23 from the annular groove 35. The user then fills the first receptacle 12 with liquid using the first aperture 32. The user then snaps the annular groove 35 in second cylindrical sidewall 34 onto the annular protrusion 23 provided on the outer surface of the first cap member 22 to connect the first receptacle 12 to the second receptacle 14. The user then rotates the second receptacle 14 with respect to the first receptacle 12 such that the first and second apertures 32, 42 are unaligned. The user then unscrews the second cap member 36 from the second receptacle 14 and places additive inside the second receptacle. The user then reattaches the second cap member 36 to the second receptacle 14.

When the user wishes to mix the additive and liquid, the user simply rotates the second receptacle 14 with respect to the first receptacle 12 such that the first and second apertures 32, 42 are aligned, which allows additive from the second chamber 18 to be introduced into the first chamber 16. The user then mixes the liquid and the additive by shaking the container 10. The user then drinks or pour the contents from the container 10 by detaching the second cap member 36 from the second receptacle 14.

The user may connect the base 20 to another container of the same construction with its second cap member removed by mating the external threaded surface on the second cylindrical sidewall 32 of the other container with the internal threaded surface of the base 20.

In use, when using the container 100, the user unthreads the insulated section 116 from the top section 118 to detach the insulated section 116 from the top section 118. The user then fills the insulated section 116 with hot liquid. The user then unscrews the cap 128 from the top of the second cylindrical sidewall 124, and fills the second receptacle 114 with an additive. The user then threadably attaches the insulated section 116 to the top section and screws the cap 128 back on the top of the second cylindrical side wall 124. The user may then add the additive in the second receptacle 114 to the liquid in the insulated section 116 in the same manner as described with respect to the container 10 above. When the user rotates the second receptacle 114 with respect to the first receptacle 112 they may grasp the annular ring 126.

In use of the container 200, closure 250 and plurality of teats 254, the user may fill the first receptacle 212 with liquid and the second receptacle with additive, and mix the liquid with the additive by moving the second receptacle with respect to the first receptacle 212 in a similar way to the way the container 10 is used as described above. Once this is done, the user may remove the second receptacle from the first receptacle 212, and attach the closure 252 to the end of the first receptacle to close the first receptacle. The user may then allow an infant to suck on the nipple portion 259 to draw fluid out of the first receptacle 212. If the infant has a preference for a specific type of teat 254, the user may select one of the plurality of teats which satisfies this preference. The user may then remove the annular mounting component 262 such that it is no longer located within the body portion 252 of the closure to detach the previous teat. The user may mount the new teat upon the closure by placing the body portion 252 over the new teat such that the nipple portion 259 of the new teat controls the flow of fluid through the outlet 258 of the body portion, and then press fitting the upper portion 265 of the annular body 264 inside the upper part 267 of the internal surface of the body portion 252 such that the portion of the main teat portion 256 is located between the upper portion of the annular body 264 and the upper part of the internal surface of the body portion 252.

Because the second receptacle is movably mounted upon the first receptacle such that the first and second apertures may be aligned to allow the contents of the second chamber to be introduced into the first chamber, the user does not need two separate containers to mix the additive with the liquid.

Because the second receptacle described herein may comprise the hopper portion, powdered additives are less likely to stick inside the second receptacle when the first and second apertures are aligned.

Because the second receptacle may be rotatably mounted upon the first receptacle, the first and second apertures may be aligned as the result of a twist action of the user.

Because the first receptacle is insulated, liquid contained therein may be kept at a high temperature. This is critical if the first chamber is filled with hot water and the second chamber is filled with formula milk powder with a view to preparing formula milk for a baby later.

The snap-fit connection ensures that the first and second receptacles may be easily detached and re-attached.

Because the at least one sidewall of the second receptacle may comprise the internal cavity, the receptacle may provide better insulation for heated or cooled liquids contained therein.

Because the base of the second receptacle may be provided with the threaded portion, the container may be connected to another container and the two containers may be carried as one unit.

All of the elements of the first receptacle may be integrally moulded as one item, rather than being formed as separate components.

The components of the container described above may each be formed from one of stainless steel, glass and plastic. Preferably, the components of the container are all made from the same material.

The annular groove may be located on the cap member and the annular protrusion may be located on the internal surface of the second cylindrical sidewall.

The opening allowing access to the first and second receptacles may be provided in either the first or second receptacle.

In the preferred example, the second receptacle moves relative to the first receptacle in a rotational manner. However, other examples are envisaged, such as an example with a sliding movement of the second receptacle with respect to the first receptacle. In this example, the second receptacle may be slidably mounted upon the first receptacle by way of an arrangement comprising a guide rail which is fixed to the first receptacle, and the first and second apertures may be aligned when the second receptacle is slid axially along the guide rail.

It is not essential that the second receptacle is rotatably mounted upon the first receptacle by way of the snap-fit connection described above. For example, the second receptacle may be mounted upon the first receptacle by way of an arrangement comprising a rolling element bearing.

Each of the inner and outer sleeves of the first receptacle may have a square cross-section or another suitable cross-section. The cross-section of the first receptacle may therefore be non-circular. Further, the inner sleeve may have a circular cross-section and the outer sleeve may have a different cross-section such as a square shaped cross-section. The inner and outer sleeves may be integrally formed, or detachable from one another.

The insulating chamber may be a vacuum or may have air located therein.

Each of the first and second receptacle may each be provided with a marking on its exterior surface. The markings may be positioned such that they indicate that the first and second apertures are aligned when the marking on the exterior surface of the first receptacle is aligned with the marking on the exterior surface of the second receptacle.

The second receptacle may comprise a teat.

The container 200, and closure 250 may be provided as a kit. The kit may optionally include at least a further teat. The further teat may have a different shape to that of the teat removably mounted upon the closure.

These and any other modifications and improvements may be incorporated without departing from the scope of the invention, which is defined by the appended claims.

The invention claimed is:

1. A container comprising:
a first receptacle having a bottom section and a top section threadably attached to the bottom section, the bottom and top sections of the first receptacle defining a first chamber, the top section having a transverse wall defining a roof of the first chamber and the transverse wall having a single first aperture;
a second receptacle defining a second chamber, the second receptacle having a single second aperture; and
a reclosable opening allowing access to the first receptacle and the second receptacle, wherein the second receptacle is movably mounted upon the first receptacle such that the first aperture and the single second aperture are alignable to allow the contents of the second chamber to be introduced into the first chamber, wherein the first receptacle is insulated, wherein the bottom section of the first receptacle comprises inner and outer sleeves which define an insulating chamber provided between the inner and outer sleeves,
wherein the second receptacle is rotatably mounted upon the first receptacle such that the single first aperture and the single second aperture are alignable,
wherein the second receptacle is rotatably mounted upon the first receptacle by way of a snap-fit connection between the top section of the first receptacle and the second receptacle that is configured to prevent axial movement of the second receptacle with respect to the first receptacle but allow rotational movement of the second receptacle with respect to the first receptacle.

2. The container of claim 1, wherein the second receptacle comprises the reclosable opening, and the first receptacle comprises a base of the container and the base is provided with a first threaded portion for connecting the base to another container having a cooperating threaded portion.

3. The container of claim 2, further comprising a lid threadably connected to the second receptacle by a second threaded portion provided on an outer surface of the second receptacle, wherein the second threaded portion is configured to cooperate with the first threaded portion of another container of the same construction as the container such that the two containers are connected.

4. The container of claim 1, wherein the inner and outer sleeves are threadably connected.

* * * * *